March 2, 1954
R. L. JONES
2,670,914
RESILIENT MOUNTING
Filed Dec. 28, 1949
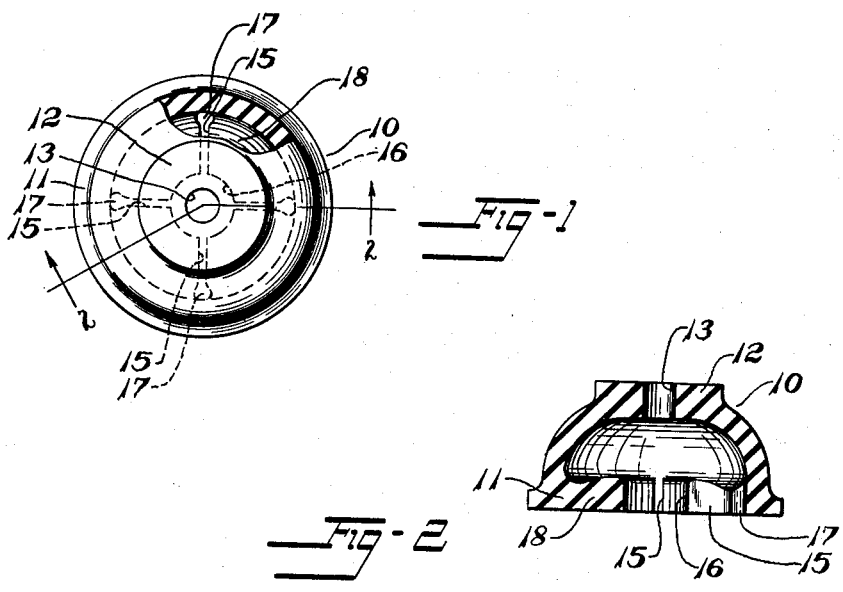
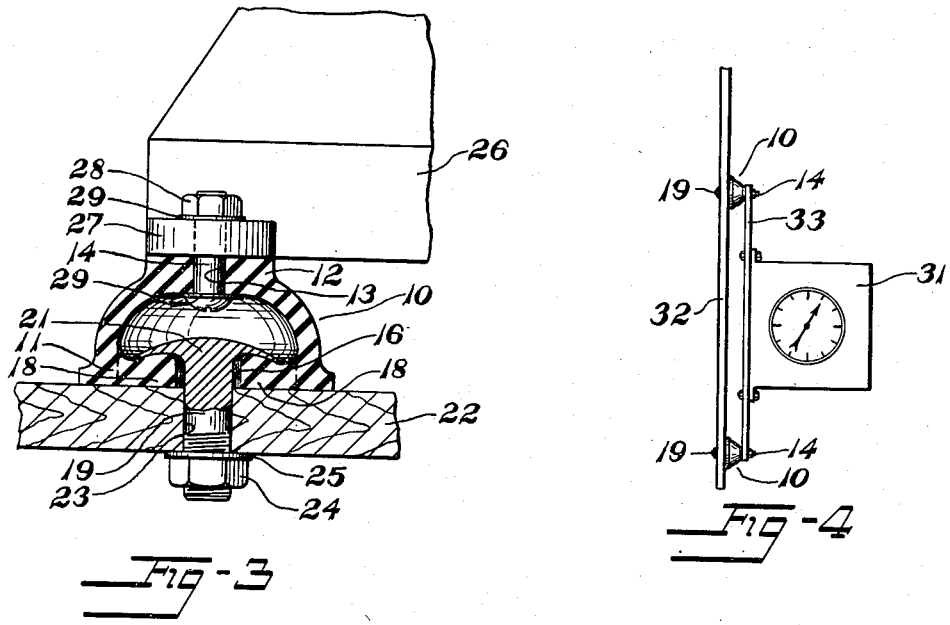
Inventor
Russell L. Jones
By Patented Mar. 2, 1954

2,670,914

UNITED STATES PATENT OFFICE 2,670,914

RESILIENT MOUNTING

Russell L. Jones, Akron, Ohio, assignor to The B. F. Goodrich Company, New York, N. Y., a corporation of New York Application December 28, 1949, Serial No. 135,325

4 Claims. (Cl. 248—24)

This invention relates to resilient mountings and especially to mountings for isolating vibrating machinery and for protecting instruments and delicate electrical equipment from harmful vibrations and shocks.

It is an object of this invention to provide a resilient mounting utilizing easily fabricated or standard metal parts, and which requires no bonding of the rubber cushioning material to the metal parts.

Other objects are to provide cushioning in tension, compression and shear of the cushioning material, to provide for stability of the mounting, to provide for enclosing the metal parts of the mounting disposed between supported and supporting structures and to provide for ease of installation and effectiveness in operation.

These and other objects will be apparent from the following description, reference being had to the accompanying drawings in which:

Fig. 1 is a plan view of the cushioning body of the resilient mounting constructed in accordance with and embodying the invention, parts being broken away.

Fig. 2 is a section taken along line 2—2 of Fig. 1.

Fig. 3 is an elevation of the resilient mounting of the invention mounted on the supported and supporting structures, parts being sectioned and broken away.

Fig. 4 is an elevation showing an instrument mounted on a supporting structure with resilient mountings embodying the invention.

Referring to the drawings and especially to Figs. 1 and 2, a cushioning body 10 of resilient rubber material is shown which is adapted to provide cushioning in accordance with the invention. The cushioning body 10 which may be formed by suitable means such as by molding, is hollow and preferably has a generally conical or domed shape with a base 11 of larger diameter than the diameters of the upper portions of the body. An upper central portion 12 is provided which has a central aperture 13 for receiving suitable attaching means such as bolt 14 shown in Fig. 3.

The base 11 of the cushioning body 10 has radially extending slots 15, 15 diverging from an aperture 16 which is relatively small and may also be centrally located as shown in Figs. 1 and 2. Each of the slots 15, 15 may have an enlarged opening at the outer end 17 for preventing a concentration of stresses at the outer end. The slots 15, 15 separate sectors 18, 18 of the base 11 and permit the sectors to fold inward or outward to permit an attaching member in the form of a bolt 14 to be inserted into the aperture 13 and permit the entrance of a bolt 19 into the cavity of the cushioning body 10 as shown in Fig. 3. The bolt 19 preferably has an enlarged head 21 of a greater diameter than aperture 16 and overlaps the base portion 11 for clamping the base portion to the face of a supported or supporting structure such as board 22. The board 22 has an aperture 23 through which bolt 19 may be inserted and a nut 24 and washer 25 may be threaded on the bolt for clamping the base 11 of the cushioning body 10 between the bolt head 21 and the board 22.

The bolt 19 preferably has a concave surface abutting the base 11 to urge the material of the base 11 toward the bolt as it is compressed. The base 11 may also have a convex shape as shown in Fig. 2 for increasing the tendency of the base material to be urged toward the central aperture under compression of the base material by the bolt 19 and thereby provide a secure attachment of the cushioning body 10 to the board 22.

The upper central portion 12 of the cushioning body 10 may also be secured to the supported structure 26 by the bolt 14 inserted in an aperture in lug 27 of the supported structure and held against the lug by a nut 28 threaded on the bolt. Washers 29, 29 may be disposed between the head of the bolt and the upper central portion 12 and between the nut 28 and the lug 27.

The cushioning body 10 may be secured to a suitable structure such as board 22 by inserting the head 21 of the bolt 19 in the cavity of the body. The sectors 18, 18 of the base 11 may be folded back to permit the entrance of the enlarged head 21 into the cavity. As the head is urged toward the board 22 the material of the base 11 is clamped securely in place. The convex contour of the base 11 and the concave face of the bolt head 21 urge the material of the base 11 towards the center and hold the cushioning body securely to the board 22. The upper central portion 12 may also be secured to a supporting or supported structure such as structure 26 by a bolt 14 as shown in Fig. 3.

If desired the cushioning body may be fastened to only one of the structures and provide cushioning or act as a bumper between the structures. As shown in Fig. 3 the cushioning body provides cushioning of vertical forces principally in compression and shear as the upper central portion is moved toward or away from the base 11 and provides cushioning principally in shear upon relative horizontal movement of the structure 26 and the board 22. The conical shape of the cushioning body 10 resists folding of the walls of the body and provides stability of cushioning.

In Fig. 4 an instrument 31 is mounted on a vertical wall 32 with resilient mountings of the invention between the wall and the instrument. The base of each cushioning body 10 is secured to the wall 32 by a bolt 19 and the upper central portion is secured to a plate 33 by a bolt 14 upon which the instrument is mounted. In this position vibrations of the wall 32 are not transmitted directly to the instrument 31 which is cushioned by the resilient mountings. Vertical movements of the wall 32 are cushioned by the cushioning body being stressed principally in shear and horizontal movements are cushioned by the cushioning body principally in tension and compression.

Variations may be made without departing from the scope of the invention as it is set forth in the following claims.

I claim:

1. A resilient mounting comprising a hollow body of resilient rubber material, a base integral with said body and enclosing the bottom of the latter, an aperture in the base, an attaching member for fastening said base to a structure which member includes a shank portion removably disposed in the aperture with a flanged head inside the hollow body overlapping the inner surface of the base for clamping the base under compression against said structure, the flanged head having a peripheral edge spaced inwardly on the base from the junction of the base and the body of the mounting, said base having a clamped portion around the margin of said aperture of greater thickness in the unclamped condition than the surrounding portions of the base and tapering gradually toward said junction, the thick margins of the aperture being deformed inwardly toward the shank by the flanged head when the member is tightened to clamp the base on the structure, and said body having a supporting portion spaced from the base for engagement with another structure with said body disposed between the structures for cushioning relative movement thereof through stressing of the resilient rubber material of said body.

2. A resilient mounting comprising a hollow body of resilient rubber material, a base integral with said body and enclosing the bottom of the latter, an aperture in said base, an attaching member for fastening said base to a structure which member includes a shank portion removably disposed in the aperture with a flanged head inside the hollow body overlapping the inner surface of said base for clamping said base portion under compression against said structure, the flanged head having a peripheral edge spaced inwardly on the base from the junction of the base and the body of the mounting and the flanged head having a concave base-abutting face for engaging the overlapped surface of the base, the base portion at the margins of said aperture being thicker in the unclamped condition than the surrounding portions of the base and the inner surface of the base tapering gradually from said aperture toward said junction in a contour complementary to said concave face of the flanged head whereby the flange is adapted to deform the thicker portions of the base toward the shank portion of the attaching member when the attaching member is tightened against a structure, and said body having a supporting portion spaced from said base portion for engagement with another structure with said body disposed between the structures for cushioning relative movement thereof through stressing of the resilient rubber material of said body.

3. A resilient mounting comprising a hollow domed body of resilient rubber material having an integral base portion for mounting on a structure, said base portion having a central aperture with slots extending generally radially away from the aperture, a bolt having a shank of smaller diameter than said aperture removably disposed in the aperture and having a flanged head within the domed body overlapping the inner surface of said base portion for clamping said base portion in compression against said structure, the base portion at the margin of said aperture being thicker in the unclamped condition than the surrounding portions of the base portion and the inner surface of the base portion tapering gradually from said aperture toward the junction of the base and the body portion, the said thicker portion at the margin of the aperture being deformable inwardly toward the aperture by the flanged head when the base is compressed against said structure, the dome body including a second supporting portion in the wall opposite said base portion, the said second supporting portion having a central aperture for receiving a bolt to clamp said body to another structure with said body cushioning relative movement of the structures through stressing of the resilient rubber material of the intervening sloping wall of said body between said structures.

4. A resilient mounting comprising a hollow domed body of resilient rubber material having an integral flat base portion disposed below and enclosing the bottom of the domed body for mounting the body on a structure, a central aperture in the base portion adapted to receive a bolt disposed through said aperture with a flanged head of the bolt inside the body overlapping the inner surface of the base for compressing said base portion against said structure, the base at the margin of the aperture being thicker in unclamped condition than the surrounding portions and the inner surface of the base tapering gradually from said thicker portion to the junction of the base and the domed body, the said thicker portion of the base at the margin of the aperture being deformable toward the aperture by the pressure of the flanged head of the bolt when the latter anchors the mounting to the structure, the base portion having at least one slotted opening therein in communication with said aperture to permit insertion of the flanged head of the bolt into the domed body, and an opening at the apex of the domed body opposite the base adapted to receive a fastening member for securing the domed body to a second structure.

RUSSELL L. JONES.

References Cited in the file of this patent

UNITED STATES PATENTS

| Number | Name | Date |
|---|---|---|
| 2,268,306 | Sarti | Dec. 30, 1941 |
| 2,278,075 | Hecht | Mar. 31, 1942 |
| 2,339,187 | Pain | Jan. 11, 1944 |
| 2,422,683 | Kaemmerling | June 24, 1947 |

FOREIGN PATENTS

| Number | Country | Date |
|---|---|---|
| 590,265 | France | June 13, 1925 |